S. L. Avery,
Animal Tether.
N° 49,492. Patented Aug. 22, 1865.
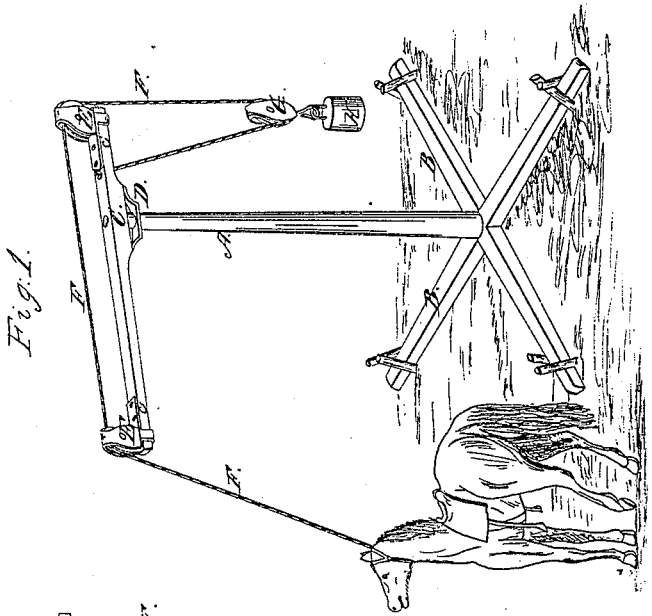
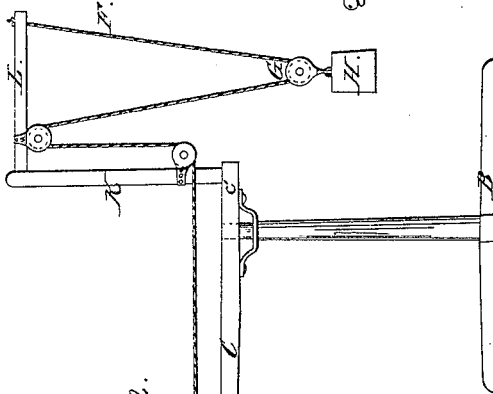
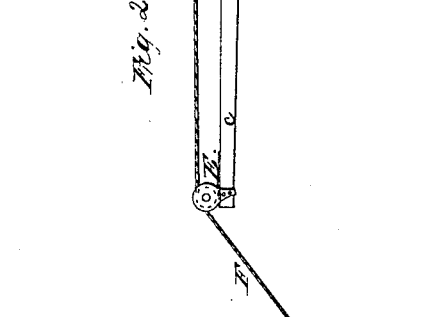
Witnesses
Freak. R. Hoffman
Gilbert B. Fowler
Inventor:
S. L. Avery
By David A Burr
Atty

UNITED STATES PATENT OFFICE.

STEPHEN L. AVERY, OF NORWICH, NEW YORK.

IMPROVEMENT IN TETHERING APPARATUS.

Specification forming part of Letters Patent No. 49,492, dated August 22, 1865.

*To all whom it may concern:*

Be it known that I, STEPHEN L. AVERY, of Norwich, in the county of Chenango and State of New York, have invented a new and Improved Apparatus for Tethering Animals while Grazing; and I do hereby declare that the following is a full, clear, and exact description of the same, reference being had to the accompanying drawings, forming a part of this specification, of which—

Figures 1 and 2 are perspective views of different forms of the same.

The nature of my invention consists in the combination of a tethering line or rope with a weight, or a suitable spring acting as an equivalent therefor, a revolving beam, and an upright post, for the purpose of giving an animal extended range in feeding while hitched to the post, and yet avoid all danger of an entanglement of the rope.

My apparatus consists of an upright post or standard, A, which may be set in the ground, but which should properly be mortised into a pair of heavy foot-beams, B B, at their point of intersection, so that it may readily be moved from place to place in a field, and yet be firmly supported wherever set up.

A transverse beam, C, is so pivoted upon the upper end of the upright A as to be free to turn horizontally thereon.

The pivot-aperture is placed at about one-third of the length of the beam, which is divided thereby into a long arm, c, and short arm c'.

A brace or collar plate, D, placed upon its under side and embracing the upright A loosely a short distance below the pivot, serves to stay the swivel-beam firmly in its horizontal position without impeding its movement.

Upon the ends of the swivel-beam C are placed suitable pulleys, E and E'. A cord or rope, F, secured to the short arm c' of the beam a short distance from the end thereof, is passed through a running-block, G, and thence up through the pulleys E' and E over the swivel-beam C, and left loose at the end of the long arm c thereof. A suitable weight, H, attached to the running-block G, keeps the end of the rope F drawn back to the end e of the swivel-beam.

The weight H, by its steady tension upon the tethering-rope F, will always keep it taut, so that the animal cannot become entangled therein, while the free movement of the beam upon its pivot prevents its entanglement about the upright A and allows the animal to graze freely in all directions around the hitching-post.

In order to obtain greater length of rope, and consequently longer range for the animal in feeding, without increasing the length or height of the post A, the modification of my apparatus illustrated in Fig. 2 of the drawings may be used. This consists in the peculiar attachment of an upright standard, K, to the short end of the swivel-beam C, this upright having a bar, L, projecting horizontally from its upper end in a right line and parallel with the swivel-beam C.

The end of the tethering-cord F is in this form of apparatus secured to the outer end of the bar L, and after passing through the running-block G, which supports the tension-weight H, and through a pulley secured beneath the bar C, near the standard K, and thence through a second pulley at the foot of said upright, extends along the swivel-beam to the outer pulley on the end thereof.

The additional height obtained by means of the upright K admits of an additional length of rope; but as the height of the swivel-post A is not increased no additional strain is put thereon.

I contemplate substituting for the weight H an equivalent therefor in the shape of a stout coiled spring acting upon a reel, upon which the inner end of the tethering-rope is wound.

The spring-actuated reel may be arranged between suitable standards upon any portion of the swivel-beam of the apparatus, and would obviate the necessity of the extra pulley-block and pulleys, as well as of the weight H, and render the apparatus more compact.

In using a spring-reel, however, instead of the weight, the tension upon the rope will not be even and uniform, as with the weight, but will be found to increase greatly as the animal walks away from the post. Hence in most cases the weight, arranged as illustrated in the drawings, will be found preferable.

Having thus fully described my invention, I claim as new and desire to secure by Letters Patent—

A tethering apparatus made substantially in the manner and for the purpose herein set forth.

The foregoing specification of my improved tethering apparatus signed by me.

STEPHEN L. AVERY.

Witnesses:
J. W. WELLER,
DANIEL WAIT.